(12) United States Patent
Ichikawa et al.

(10) Patent No.: US 9,105,408 B2
(45) Date of Patent: Aug. 11, 2015

(54) DIELECTRIC RESIN COMPOSITION FOR FILM CAPACITOR AND FILM CAPACITOR

(71) Applicant: MURATA MANUFACTURING CO., LTD., Nagaokakyo-Shi, Kyoto-Fu (JP)

(72) Inventors: Tomomichi Ichikawa, Nagaokakyo (JP); Norihiro Yoshikawa, Nagaokakyo (JP); Shinichi Kobayashi, Nagaokakyo (JP); Yasunori Hioki, Nagaokakyo (JP); Ichiro Nakaso, Nagaokakyo (JP); Tomoki Inakura, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/472,604

(22) Filed: Aug. 29, 2014

(65) Prior Publication Data

US 2014/0368970 A1 Dec. 18, 2014

Related U.S. Application Data

(63) Continuation of application No. PCT/JP2012/079601, filed on Nov. 15, 2012.

(30) Foreign Application Priority Data

Feb. 29, 2012 (JP) ................................. 2012-042736

(51) Int. Cl.

| | |
|---|---|
| *C08L 27/10* | (2006.01) |
| *H01G 4/18* | (2006.01) |
| *C08G 18/58* | (2006.01) |
| *C08L 63/00* | (2006.01) |
| *C08L 71/10* | (2006.01) |
| *C08G 18/62* | (2006.01) |
| *C08G 18/79* | (2006.01) |
| *C08G 18/80* | (2006.01) |
| *C08G 18/40* | (2006.01) |
| *H01G 4/32* | (2006.01) |
| *H01G 4/33* | (2006.01) |
| *C08L 43/00* | (2006.01) |
| *C08L 61/28* | (2006.01) |

(52) U.S. Cl.
CPC .............. *H01G 4/18* (2013.01); *C08G 18/4063* (2013.01); *C08G 18/58* (2013.01); *C08G 18/6212* (2013.01); *C08G 18/797* (2013.01); *C08G 18/8029* (2013.01); *C08L 63/00* (2013.01); *C08L 71/10* (2013.01); *H01G 4/32* (2013.01); *H01G 4/33* (2013.01); *C08L 61/28* (2013.01)

(58) Field of Classification Search
USPC ........................ 525/209; 361/301.4, 311, 323
See application file for complete search history.

(56) References Cited

U.S. PATENT DOCUMENTS

| | | |
|---|---|---|
| 2011/0310527 A1 | 12/2011 | Hioki et al. |
| 2012/0008250 A1 | 1/2012 | Nishihara et al. |

FOREIGN PATENT DOCUMENTS

| | | |
|---|---|---|
| JP | 2006-77193 A | 3/2006 |
| JP | 2008-229849 A | 10/2008 |
| WO | WO-2010-101170 A1 | 9/2010 |
| WO | WO 2010/114087 A1 | 10/2010 |

OTHER PUBLICATIONS

PCT/JP2012/079601 Written Opinion dated Feb. 5, 2013.

*Primary Examiner* — Terressa Boykin
(74) *Attorney, Agent, or Firm* — Arent Fox LLP

(57) ABSTRACT

A resin composition constituting dielectric resin films of a film capacitor includes a first atom group including at least one functional group selected from among a methylene group, an aromatic ring and an ether group and having a relatively small molar polarizability, and a second atom group including at least one functional group selected from among a hydroxyl group, an amino group and a carbonyl group and having a relatively large molar polarizability. The resin composition satisfies the condition that a value calculated from the formula (sum of absorption band intensities of first atom group)/(sum of absorption band intensities of second atom group) is 1.0 or more. Herein, as absorption band intensities of the functional groups, peak intensities detected in specific wavenumber ranges are employed.

10 Claims, 1 Drawing Sheet

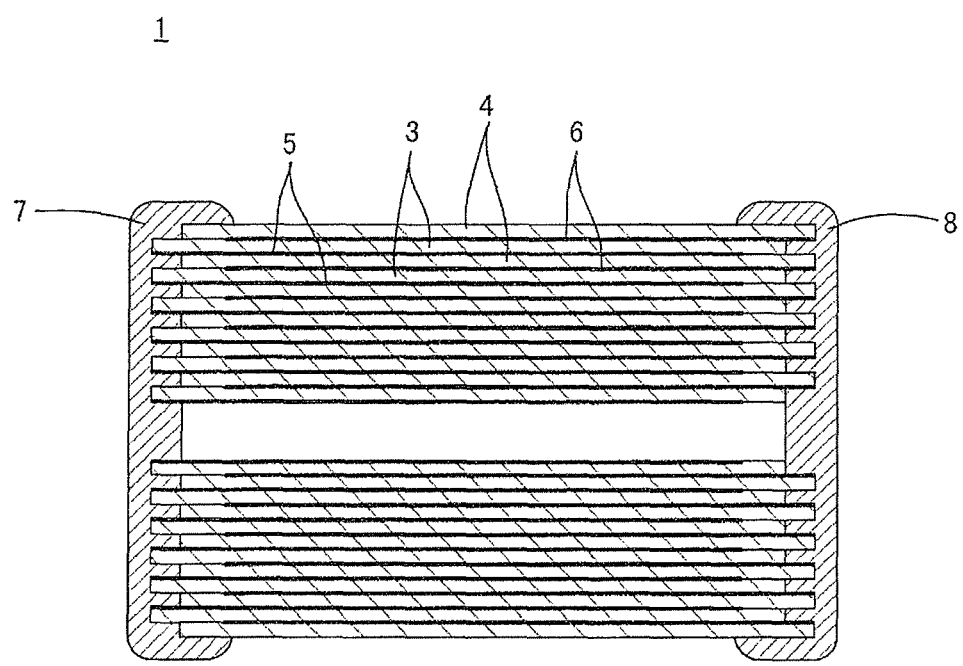

DIELECTRIC RESIN COMPOSITION FOR FILM CAPACITOR AND FILM CAPACITOR

CROSS REFERENCE TO RELATED APPLICATIONS

The present application is a continuation of International application No. PCT/JP2012/079601, filed Nov. 15, 2012, which claims priority to Japanese Patent Application No. 2012-042736, filed Feb. 29, 2012, the entire contents of each of which are incorporated herein by reference.

FIELD OF THE INVENTION

The present invention relates to a dielectric resin composition for a film capacitor and a film capacitor configured by using the dielectric resin composition and particularly to an improvement for reducing the dielectric loss tangent of a dielectric resin composition for a film capacitor.

BACKGROUND OF THE INVENTION

As one type of capacitor, there is a film capacitor having a structure in which a resin film having flexibility is used as a dielectric body and first and second counter electrodes opposed to each other are arranged with the resin film sandwiched therebetween. A film capacitor usually has an approximately cylindrical shape formed by winding a resin film as the dielectric body described above, and first and second external terminal electrodes are formed on a first end face and a second end face of the cylinder opposed to each other, respectively. The first counter electrode is electrically connected to the first external terminal electrode and the second counter electrode is electrically connected to the second external terminal electrode.

As a dielectric resin film for the above-mentioned film capacitor, it is described, for example, in WO 2010/101170 A (Patent Document 1) to use a dielectric resin film made of a thermosetting resin. The dielectric resin film made of a thermosetting resin has a feature of high heat resistance and excellent voltage endurance.

As a resin having particularly excellent voltage endurance, a resin formed by curing a mixed liquid of polyvinyl acetoacetal (PVAA) and tolylene diisocyanate (TDI), disclosed in Patent Document 1, has a high withstand voltage of 350 V/μm at 125° C.

On the other hand, in recent years, frequencies of electronic devices increase and better high frequency characteristics of electronic components are increasingly required. A major problem in a capacitor is a dielectric loss tangent (tan δ) at high frequency. The dielectric loss tangent is preferably lower, and is ideally zero. A high value thereof causes energy loss and heat generation associated therewith, resulting in the problems that the operation of a high frequency circuit becomes unstable or the life of an electronic component is shortened. The PVAA/TDI described above has a problem that the dielectric loss tangent exceeds 0.75% at 125° C. and at a frequency of 1 kHz based on the data disclosed in Patent Document 1, and therefore use of the PVAA/TDI is difficult in applications where heat generation causes a problem.
Patent Document 1: WO 2010/101170 A

SUMMARY OF THE INVENTION

Thus, it is an object of the present invention to provide a dielectric resin composition for a film capacitor having a low dielectric loss tangent, which can solve the above-mentioned problems.

It is another object of the present invention to provide a film capacitor configured by using the above-mentioned dielectric resin composition for a film capacitor.

The present invention is first directed to a dielectric resin composition for a film capacitor, and characterized by having the following constitution in order to solve the technical problems described above.

That is, the dielectric resin composition for a film capacitor according to the present invention includes a first atom group including at least one functional group selected from among a methylene group ($CH_2$ group), an aromatic ring and an ether group (—O— group) and having a relatively small molar polarizability; and a second atom group including at least one functional group selected from among a hydroxyl group (OH group), an amino group (NH group) and a carbonyl group ($C{=}O$ group) and having a relatively large molar polarizability. Then, the dielectric resin composition for a film capacitor is characterized in that, with respect to absorption band intensities of the functional groups, a value calculated from the formula (sum of absorption band intensities of first atom group)/(sum of absorption band intensities of second atom group) is 1.0 or more, when as the absorption band intensity resulting from the methylene group, an intensity of a peak of a methylene group on the lowest wavenumber side out of 4 peaks detected in a wavenumber range of 3000 to 2900 $cm^{-1}$ is employed, as the absorption band intensity resulting from the aromatic ring, an intensity of a peak detected in a wavenumber range of 1650 to 1550 $cm^{-1}$ is employed, as the absorption band intensity resulting from the ether group, intensities of two peaks detected in a wavenumber range of 1150 to 1050 $cm^{-1}$ and a wavenumber range of 900 to 800 $cm^{-1}$ are employed, as the absorption band intensity resulting from the hydroxyl group, an intensity of a peak detected in a wavenumber range of 3700 to 3400 $cm^{-1}$ is employed, as the absorption band intensity resulting from the amino group, an intensity of a peak detected in a wavenumber range of 3400 to 3200 $cm^{-1}$ is employed, and as the absorption band intensity resulting from the carbonyl group, an intensity of a peak detected in a wavenumber range of 1750 to 1650 $cm^{-1}$ is employed.

The dielectric resin composition for a film capacitor according to the present invention is preferably a cured product obtained by a reaction of at least two types of organic materials including a first organic material and a second organic material.

In the above case, a phenoxy resin is favorably used as the first organic material, and an isocyanate compound, an epoxy resin or a melamine resin is favorably used as the second organic material.

The present invention is also directed to a film capacitor configured by using the dielectric resin composition for a film capacitor described above. The film capacitor according to the present invention is characterized by including a dielectric resin film composed of the dielectric resin composition for a film capacitor described above, and first and second counter electrodes opposed to each other with the dielectric resin film sandwiched therebetween.

With the dielectric resin composition for a film capacitor according to the present invention, since the amount of the first atom group having a relatively small polarizability contained in the composition is larger than that of the second atom group having a relatively large polarizability, the dielectric loss tangent at 125° C. can be made as low as, for example, 0.6% or less.

Accordingly, when a film capacitor is configured by using the dielectric resin composition, heat generation of the film capacitor due to dielectric loss inherent in a dielectric material can be reduced, and the film capacitor can be used at high frequency without any problem.

When the dielectric resin composition for a film capacitor according to the present invention is a cured product obtained by a reaction of at least two types of organic materials, the glass transition point can be made 130° C. or higher, and therefore heat resistance of the dielectric resin film is increased and the guaranteed temperature of the film capacitor can be made high, for example, 125° C. or higher.

BRIEF EXPLANATION OF THE DRAWING

The FIGURE is a vertical sectional view showing a film capacitor 1 as an embodiment configured by using a dielectric resin composition according to the present invention.

DETAILED DESCRIPTION OF THE INVENTION

In reference to the FIGURE, a film capacitor configured by using a dielectric resin composition according to the present invention will be described.

The film capacitor 1 shown in the FIGURE is a wound type film capacitor, briefly speaking, a film capacitor including first and second dielectric resin films 3 and 4 in a wound state, first and second counter electrodes 5 and 6 opposed to each other with the first dielectric resin film 3 or the second dielectric resin film 4 sandwiched therebetween, and first and second external terminal electrodes 7 and 8 electrically connected to the counter electrodes 5 and 6, respectively.

More specifically, the first counter electrode 5 is formed on the first dielectric resin film 3 and the second counter electrode 6 is formed on the second dielectric resin film 4. At this time, the first counter electrode 5 is formed so as to reach one side edge of the first dielectric resin film 3 but not to reach the other side edge. On the other hand, the second counter electrode 6 is formed so as not to reach one side edge of the second dielectric resin film 4 but to reach the other side edge. The counter electrodes 5 and 6 are composed of, for example, an aluminum film.

The first and second dielectric resin films 3 and 4 are in a state of being stacked before winding. At this time, as can be seen in the FIGURE, the first dielectric resin film 3 and the second dielectric resin film 4 are displaced from each other in the width direction so that both an end on a side reaching the side edge of the first dielectric resin film 3 in the first counter electrode 5, and an end on a side reaching the side edge of the second dielectric resin film 4 in the second counter electrode 6 are exposed. Then, a substantially cylindrical capacitor main body 9 is obtained by winding the first and second resin films 3 and 4 in the state described above.

In addition, in the film capacitor 1 shown in the FIGURE, the first and second dielectric resin films 3 and 4 are wound such that the second dielectric resin film 4 exists outside of the first dielectric resin film 3 and such that each of the first and second counter electrodes 5 and 6 faces inward for each of the first and second dielectric resin films 3 and 4.

The first and second external terminal electrodes 7 and 8 are formed, for example, by thermally spraying zinc on each end face of the substantially cylindrical capacitor main body 9 thus obtained. The first external terminal electrode 7 is in contact with an exposed end portion of the first counter electrode 5, and thereby the first external terminal electrode 7 is electrically connected to the first counter electrode 5. On the other hand, the second external terminal electrode 8 is in contact with an exposed end portion of the second counter electrode 6, and thereby the second external terminal electrode 8 is electrically connected to the second counter electrode 6.

Although not shown in the FIGURE, the film capacitor may include a cylindrical winding shaft. That is, the winding shaft is arranged on a central axis line of the first and second dielectric resin films in a state of being wound, and serves as a winding axis in winding the first and second dielectric resin films. When the film capacitor does not include a winding shaft as with the film capacitor 1 shown in the FIGURE, a wound body of the first and second dielectric resin films 3 and 4 may be pressed so as to have an elliptical or oblong cross-section shape, resulting in a more compact shape.

The dielectric resin films 3 and 4 included in such a film capacitor 1 are configured from the dielectric resin composition according to the present invention.

A principal dominant factor having an effect on the dielectric loss tangent of a polymer dielectric body is functional groups contained in a polymer. In order to reduce the dielectric loss tangent, it is necessary to reduce atom groups having high polarity. On the other hand, for example, in the case of a curable resin which is cured by the reaction of at least two types of organic materials, since the starting material contains atom groups having high polarity as a reaction point, a cured product tends to contain atom groups having a large polarizability, resulting in an increase in the dielectric loss tangent.

Patent Document 1 described above discloses a cross-linked resin of polyvinyl acetoacetal and an isocyanate; however, the dielectric loss tangent of the resin exceeds 0.75%. It is thought as a reason therefor that a molecular backbone containing a urethane group having a large polarizability contributes to a cured product.

Thus, the present invention employs a method in which, in order to reduce the dielectric loss tangent, the ratio of an atom group having a relatively large molar polarizability per molar volume in a resin composition is decreased and the ratio of an atom group having a relatively small molar polarizability per molar volume in a resin composition is increased. Herein, in general, the atom group having a large molar polarizability per molar volume means a functional group having high polarity and the atom group having a small molar polarizability means a functional group having low polarity.

The dielectric resin composition according to the present invention includes a first atom group including at least one functional group selected from among a methylene group ($CH_2$ group), an aromatic ring and an ether group (—O— group) and having a relatively small molar polarizability; and a second atom group including at least one functional group selected from among a hydroxyl group (OH group), an amino group (NH group) and a carbonyl group (C=O group) and having a relatively large molar polarizability, and the resin composition is characterized by satisfying the condition that a value calculated from the formula (sum of absorption band intensities of first atom group)/(sum of absorption band intensities of second atom group) is 1.0 or more.

In addition, with respect to absorption band intensities of the functional groups, as the absorption band intensity resulting from the methylene group, an intensity of a peak of a methylene group on the lowest wavenumber side out of 4 peaks detected in a wavenumber range of 3000 to 2900 $cm^{-1}$ is employed, as the absorption band intensity resulting from the aromatic ring, an intensity of a peak detected in a wavenumber range of 1650 to 1550 $cm^{-1}$ is employed, as the absorption band intensity resulting from the ether group, intensities of two peaks detected in a wavenumber range of 1150 to 1050 cm$^{-1}$ and a wavenumber range of 900 to 800 cm$^{-1}$ are employed, as the absorption band intensity resulting from the hydroxyl group, an intensity of a peak detected in a wavenumber range of 3700 to 3400 cm$^{-1}$ is employed, as the absorption band intensity resulting from the amino group, an intensity of a peak detected in a wavenumber range of 3400 to 3200 cm$^{-1}$ is employed, and as the absorption band intensity resulting from the carbonyl group, an intensity of a peak detected in a wavenumber range of 1750 to 1650 cm$^{-1}$ is employed.

In addition, the methylene group, the aromatic ring, the ether group, the hydroxyl group, the amino group and the carbonyl group, respectively described above, are known to be functional groups having a particularly predominant influence on the dielectric loss tangent. The dielectric resin composition according to the present invention needs not include all of these functional groups, and the absorption band intensity of any one of the functional groups may be, for example, zero in each of the first atom group and the second atom group. Further, the dielectric resin composition may include a functional group other than the above-mentioned functional groups.

The dielectric resin composition for a film capacitor according to the present invention is preferably a cured product obtained by a reaction of at least two types of organic materials including the first organic material and the second organic material. Thereby, the glass transition point can be made 130° C. or higher, and therefore heat resistance of the dielectric resin films 3 and 4 shown in the FIGURE can be increased and the guaranteed temperature of the film capacitor 1 can be made high, for example, 125° C. or higher.

In addition, when a phenoxy resin is favorably used as the first organic material, and an isocyanate compound, an epoxy resin or a melamine resin is favorably used as the second organic material, the effect of reducing the dielectric loss tangent is particularly enhanced.

EXPERIMENT EXAMPLE

Next, an experiment example carried out in order to verify the effect of the present invention will be described.

(1) Preparation of Samples

As shown in the columns of "Organic Material 1" and "Organic Material 2" of Table 2 shown later, a phenoxy resin and PVAA (polyvinyl acetoacetal) were prepared as an organic material 1, and TDI (tolylene diisocyanate), an epoxy resin, a melamine resin and MDI (diphenylmethane diisocyanate) were prepared as an organic material 2.

In addition, as the phenoxy resin, a phenoxy resin, which is a high molecular weight bisphenol A type epoxy resin having an epoxy group at a terminal, was used.

As the TDI, trimethyl propanol-modified tolylene diisocyanate was used.

As the epoxy resin, a novolac type epoxy resin was used.

As the melamine resin, an alkylated melamine resin was used.

As the MDI, a mixture (weight ratio: 70 to 30) of 4,4'-diphenylmethane diisocyanate and a carbodiimide-modified product thereof was used.

Next, a resin solution prepared by mixing the organic material 1 with the organic material 2 in proportions shown in the column of "Weight Ratio" of Table 2 was formed into a film on a PET film with a doctor blade coater to obtain an uncured film having a thickness of 5 μm. Then, the film was heat-treated for 2 hours in a hot-air oven set at 180° C. for thermal curing to obtain a dielectric resin film as a sample.

In addition, the samples 1 to 20 shown in Table 2 are classified into five groups of a first group of the samples 1 to 4, a second group of the samples 5 to 8, a third group of the samples 9 to 12, a fourth group of the samples 13 to 16, and a fifth group of the samples 17 to 20 depending on the combination of the types of the "organic material 1" and the "organic material 2". In the first to fourth groups among these five groups, "phenoxy" is common to the "organic material 1", and the sample denoted by the minimum sample No. within each group has a weight ratio of the "organic material 2" of "0" common to the four groups. Accordingly, the samples denoted by the minimum sample No. within each group, that is, the sample 1, the sample 5, the sample 9 and the sample 13 are the same samples.

In preparing the resin solution, in the case of the samples 1 to 4, a phenoxy resin was dissolved in a mixed solvent of methyl ethyl ketone and toluene to prepare a phenoxy resin solution, and particularly in the samples 2 and 3, TDI dissolved in ethyl acetate was mixed in the phenoxy resin solution.

In the case of the samples 5 to 8, a phenoxy resin was dissolved in a mixed solvent of methyl ethyl ketone and toluene to prepare a phenoxy resin solution, and particularly in the samples 6 to 8, an epoxy resin dissolved in a methyl ethyl ketone solvent was mixed in the phenoxy resin solution. In addition, in the samples 5 to 8, a 0.1% imidazole catalyst was added as a catalyst for promoting a curing reaction in a thermal-curing step.

In the case of the samples 9 to 12, a phenoxy resin was dissolved in a methyl ethyl ketone solvent to prepare a phenoxy resin solution, and particularly in the samples 10 to 12, a melamine resin dissolved in butanol was mixed in the phenoxy resin solution.

In the case of the samples 13 to 16, a phenoxy resin was dissolved in a methyl ethyl ketone solvent to prepare a phenoxy resin solution, and particularly in the samples 14 to 16, MDI dissolved in ethyl acetate was mixed in the phenoxy resin solution.

(2) Measurement of Absorption Band Intensity

The value of "(Sum of Atom Group 1)/(Sum of Atom Group 2)" in Table 2 is a value calculated from the above-mentioned formula (sum of absorption band intensities of first atom group)/(sum of absorption band intensities of second atom group). The absorption band intensity of the functional group in the formula was measured in the following manner.

First, infrared absorption spectrums of various functional groups shown in the columns of "Peak Intensity of Absorption Band in FT-IR Spectrum" of Table 2 were measured by an attenuated total reflection (ATF) method by using a Fourier transform infrared spectrophotometer (FT-IR). A wavenumber range of 4000 cm$^{-1}$ to 500 cm$^{-1}$ was used. "FT/IR-4100 ST" manufactured by JASCO Corporation was used for measurement. The cumulated number was 64 and resolution power was 4 cm$^{-1}$. The thickness of the dielectric resin film used in measurement was 5 μm as previously described.

TABLE 1

| | | Position of Absorption Band in FT-IR Spectrum |
|---|---|---|
| Atom Group 1 | CH$_2$ group | 3000 to 2900 cm$^{-1}$ |
| | Aromatic ring | 1650 to 1550 cm$^{-1}$ |
| | Ether group 1 | 1150 to 1050 cm$^{-1}$ |
| | Ether group 2 | 900 to 800 cm$^{-1}$ |
| Atom Group 2 | OH group | 3700 to 3400 cm$^{-1}$ |
| | NH group | 3400 to 3200 cm$^{-1}$ |
| | C=O group | 1750 to 1650 cm$^{-1}$ |

In determining the absorption band intensity, the peak intensities at the "Position of Absorption Band in FT-IR Spectrum" shown in Table 1 were employed. That is, an absorption band which was found in the wavenumber range shown in the column of "Position of Absorption Band in FT-IR Spectrum" of Table 1 identified from the FT-IR spectrum was attributed to each functional group, and the intensity of a peak found in each range was read. In reading peak intensity, a base line was drawn on both sides of the peak, and the height from the base line to the top of the peak was taken as peak intensity.

In addition, functional groups other than those shown in Table 1 were contained in the dielectric resin films as the samples.

Absorption band intensities, namely, peak intensities, of the functional groups thus measured are shown in the column of "Peak Intensity of Absorption Band in FT-IR Spectrum" in Table 2. As is apparent from this column and Table 1, two peaks are present in the FT-IR spectrum for the ether group.

The "(Sum of Atom Group 1)/(Sum of Atom Group 2)" in Table 2 is calculated from the sum of peak intensities (the sum of the atom group 1) of "CH$_2$ group", "Aromatic ring", "Ether group 1" and "Ether group 2" respectively belonging to "Atom Group 1" (atom group having a relatively small molar polarizability), and the sum of peak intensities (the sum of the atom group 2) of "OH group", "NH group" and "C=O group" respectively belonging to "Atom Group 2" (atom group having a relatively large molar polarizability) in "Peak Intensity of Absorption Band in FT-IR Spectrum" in Table 2.

(3) Measurement of Dielectric Loss Tangent

Al electrodes were formed on both sides of a dielectric resin film as a sample and the dielectric loss tangent (tan δ) was measured under the conditions of a wavenumber of 1 kHz, a measurement voltage of 1 V and a measurement temperature of 125° C. by using an LCR meter (4284A, manufactured by Agilent Technologies, Inc.). The results are shown in the column of "Dielectric Loss Tangent" of Table 2.

(4) Measurement of Glass Transition Point

Glass transition points of thermally cured dielectric resin films as samples were measured with a DMA (dynamic viscoelasticity measuring device, "RSA-III" manufactured by TA Instruments Japan Inc.). Speaking of measurement conditions, the temperature of a sample was increased at a temperature rise rate of 10° C./min from room temperature to 250° C., the wavenumber was set to 10 rad/sec, the strain was set to 0.1%, and the temperature at which the loss tangent (tan δ) exhibits a maximum peak value was determined. The results are shown in the column of "Tg" of Table 2.

(5) Evaluation

TABLE 2

| Sample No. | Organic Material 1 | Organic Material 2 | Weight Ratio Organic Material 1 | Weight Ratio Organic Material 2 | Atom Group 1 CH$_2$ group | Atom Group 1 Aromatic ring | Atom Group 1 Ether Group 1 | Atom Group 1 Ether Group 2 | Atom Group 2 OH group | Atom Group 2 NH group | Atom Group 2 C=O group | (Sum of Atom Group 1)/(Sum of Atom Group 2) | Dielectric Loss Tangent @ 125° C. [%] | Tg [° C.] | Overall Evaluation |
|---|---|---|---|---|---|---|---|---|---|---|---|---|---|---|---|
| 1 | phenoxy | TDI | 100 | 0 | 0.07 | 0.12 | 0.40 | 0.40 | 0.04 | 0.00 | 0.06 | 9.9 | 0.28 | 101 | ○ |
| 2 | | | 70 | 30 | 0.04 | 0.08 | 0.40 | 0.10 | 0.03 | 0.20 | 0.15 | 1.6 | 0.33 | 160 | ⊙ |
| 3 | | | 50 | 50 | 0.04 | 0.09 | 0.45 | 0.08 | 0.02 | 0.30 | 0.20 | 1.3 | 0.55 | 170 | ⊙ |
| *4 | | | 30 | 70 | 0.04 | 0.14 | 0.50 | 0.04 | 0.02 | 0.50 | 0.30 | 0.9 | 0.70 | 180 | X |
| 5 | phenoxy | epoxy | 100 | 0 | 0.07 | 0.12 | 0.40 | 0.40 | 0.04 | 0.00 | 0.06 | 9.9 | 0.28 | 101 | ○ |
| 6 | | | 70 | 30 | 0.04 | 0.12 | 0.30 | 0.28 | 0.03 | 0.00 | 0.06 | 8.6 | 0.25 | 140 | ⊙ |
| 7 | | | 50 | 50 | 0.04 | 0.11 | 0.29 | 0.30 | 0.03 | 0.00 | 0.08 | 6.8 | 0.30 | 172 | ⊙ |
| 8 | | | 30 | 70 | 0.04 | 0.11 | 0.28 | 0.40 | 0.04 | 0.00 | 0.12 | 5.3 | 0.35 | 180 | ⊙ |
| 9 | phenoxy | melamine | 100 | 0 | 0.07 | 0.12 | 0.40 | 0.40 | 0.04 | 0.00 | 0.06 | 9.9 | 0.28 | 101 | ○ |
| 10 | | | 70 | 30 | 0.04 | 0.20 | 0.30 | 0.11 | 0.03 | 0.02 | 0.03 | 8.7 | 0.30 | 135 | ⊙ |
| 11 | | | 50 | 50 | 0.04 | 0.30 | 0.30 | 0.18 | 0.03 | 0.03 | 0.03 | 9.6 | 0.32 | 162 | ⊙ |
| 12 | | | 30 | 70 | 0.04 | 0.40 | 0.30 | 0.28 | 0.04 | 0.04 | 0.03 | 9.3 | 0.40 | 182 | ⊙ |
| 13 | phenoxy | MDI | 100 | 0 | 0.07 | 0.12 | 0.40 | 0.40 | 0.04 | 0.00 | 0.06 | 9.9 | 0.28 | 101 | ○ |
| 14 | | | 70 | 30 | 0.04 | 0.07 | 0.30 | 0.03 | 0.03 | 0.02 | 0.12 | 2.7 | 0.26 | 165 | ⊙ |
| 15 | | | 50 | 50 | 0.04 | 0.10 | 0.35 | 0.10 | 0.03 | 0.03 | 0.14 | 3.0 | 0.28 | 175 | ⊙ |
| 16 | | | 30 | 70 | 0.04 | 0.13 | 0.40 | 0.15 | 0.04 | 0.03 | 0.20 | 2.8 | 0.30 | 190 | ⊙ |
| 17 | PVAA | TDI | 100 | 0 | 0.06 | 0.00 | 0.00 | 0.40 | 0.04 | 0.00 | 0.06 | 4.6 | 0.41 | 105 | ○ |
| *18 | | | 70 | 30 | 0.05 | 0.08 | 0.01 | 0.15 | 0.03 | 0.20 | 0.20 | 0.7 | 0.62 | 155 | X |
| *19 | | | 50 | 50 | 0.05 | 0.06 | 0.01 | 0.13 | 0.02 | 0.30 | 0.25 | 0.4 | 0.74 | 175 | X |
| *20 | | | 30 | 70 | 0.04 | 0.04 | 0.01 | 0.10 | 0.02 | 0.50 | 0.40 | 0.2 | 0.85 | 185 | X |

In Table 2, each sample No. with an asterisk indicates a sample of a comparative example which is out of the scope of the present invention. Further, in the column of "Overall Evaluation" of Table 2, samples whose "dielectric loss tangent" exceeds 0.6% were rated as "X (poor)". On the other hand, samples whose "dielectric loss tangent" was 0.6% or less were rated as "○ (good)" or "⊙ (excellent)", and among them, samples having a "Tg" of 130° C. or higher were rated as "⊚".

Evaluation results of the samples will be considered in reference to Table 2, and modified examples of the samples will also be disclosed as required.

(5-1) Samples 1 to 4

When the "(Sum of Atom Group 1)/(Sum of Atom Group 2)" was as large as 1.0 or more as in the samples 1 to 3, that is, when the ratio of the functional group having a relatively small molar polarizability in the dielectric resin composition for constituting a film as a sample was increased, the dielectric loss tangent was made as low as 0.6% or less.

On the other hand, when the "(Sum of Atom Group 1)/(Sum of Atom Group 2)" was as small as less than 1.0 as in the sample 4, that is, when the ratio of the functional group having a relatively large molar polarizability in the dielectric resin composition for constituting a film as a sample was increased, the dielectric loss tangent exceeded 0.6%.

Further, when the dielectric resin film was a cured product obtained by the reaction of the "organic material 1" with the "organic material 2" as in the samples 2 to 4, a glass transition point of 130° C. or higher was achieved.

Considering all the results described above together, it is said that the samples 2 and 3 are more excellent in that they achieved superior results on both of dielectric loss tangent and heat resistance.

(5-2) Modified Examples of Samples 1 to 4

In the samples 1 to 4, a phenoxy resin was used as the "organic material 1"; however, the same effect can be expected for a material other than the phenoxy resin. Further, the phenoxy resin belongs to polyether polyols, but a polyether polyol other than the phenoxy resin may be used. Moreover, even when a material other than polyether polyols or a polyol such as a polyester polyol is used, the same effect can be expected. The same effect can be expected also when two types of organic materials are used in combination as the "organic material 1".

Further, in the samples 2 to 4, TDI (trimethyl propanol-modified tolylene diisocyanate) was used as the "organic material 2"; however, a TDI monomer or a modified product thereof can also be expected to have the same effect as long as it is a TDI-based isocyanate compound.

(5-3) Samples 5 to 8

In the samples 5 to 8, the "(Sum of Atom Group 1)/(Sum of Atom Group 2)" was as large as 1.0 or more, and therefore the dielectric loss tangent was made as low as 0.6% or less.

Further, when the dielectric resin film was a cured product obtained by the reaction of the "organic material 1" with the "organic material 2" as in the samples 6 to 8, a glass transition point of 130° C. or higher was achieved.

Considering all the results described above together, it is said that the samples 6 to 8 are more excellent in that they achieved superior results on both of dielectric loss tangent and heat resistance.

(5-4) Modified Examples of Samples 5 to 8

In the samples 5 to 8, a phenoxy resin (a high molecular weight bisphenol A type epoxy resin having an epoxy group at a terminal) was used as the "organic material 1". Particularly, in the samples 6 to 8, the phenoxy resin of the "organic material 1" serves as a main material and the epoxy resin of the "organic material 2" serves as a curing component. In this case, the "organic material 1" as a main material is not particularly limited to the phenoxy resin, and it is thought that the same effect is achieved when using a combination in which the "(Sum of Atom Group 1)/(Sum of Atom Group 2)" is 1 or more.

A material other than the phenoxy resin is not particularly limited as long as it is a material capable of reacting with an epoxy resin of the "organic material 2", and the same effect can be expected when using a polymer having an epoxy group at a terminal or a polymer having an epoxy on a side chain. Further, the same effect can be expected also when two types of main materials are used in combination.

As the "organic material 2", an epoxy resin capable of reacting with the "organic material 1" is used. The epoxy resin referred to herein is not particularly limited as long as it is an organic material having an epoxy ring, and a bisphenol A type epoxy resin, an epoxy resin having a biphenyl skeleton, an epoxy resin having a cyclopentadiene skeleton, an epoxy resin having a naphthalene skeleton, and the like can be used.

As a curing agent for the epoxy resin, an imidazole curing agent, an acid anhydride curing agent, and a phenol curing agent are preferred, and the imidazole curing agent is particularly preferred.

(5-5) Samples 9 to 12

In the samples 9 to 12, the "(Sum of Atom Group 1)/(Sum of Atom Group 2)" was as large as 1.0 or more, and therefore the dielectric loss tangent was made as low as 0.6% or less.

Further, when the dielectric resin film was a cured product obtained by the reaction of the "organic material 1" with the "organic material 2" as in the samples 10 to 12, a glass transition point of 130° C. or higher was achieved.

Considering all the results described above together, it is said that the samples 10 to 12 are more excellent in that they achieved superior results on both of dielectric loss tangent and heat resistance.

(5-6) Modified Examples of Samples 9 to 12

In the samples 9 to 12, a phenoxy resin was used as the "organic material 1"; however, the same effect can be expected for a material other than the phenoxy resin. The phenoxy resin belongs to polyether polyols, but a polyether polyol other than the phenoxy resin may be used as with the samples 1 to 4. Moreover, even when a material other than polyether polyols or a polyol such as a polyester polyol is used, the same effect can be expected. The same effect can be expected also when two types of organic materials are used in combination as the "organic material 1".

Further, in the samples 10 to 12, an alkylated melamine resin capable of reacting with the "organic material 1" was used as the "organic material 2"; however, the organic material 2 is not particularly limited as long as it is a melamine resin, and can be expected to have the same effect. The melamine resin referred to herein is an organic nitrogen compound having a triazine ring at the center of the structure and three amino groups around the triazine ring. The organic material 2 is not limited to the alkylated melamine resin as long as it is a melamine resin, and can be expected to have the same effect, and other modified products of melamine may be employed.

(5-7) Samples 13 to 16

In the samples 13 to 16, the "(Sum of Atom Group 1)/(Sum of Atom Group 2)" was as large as 1.0 or more, and therefore the dielectric loss tangent was made as low as 0.6% or less.

Further, when the dielectric resin film was a cured product obtained by the reaction of the "organic material 1" with the "organic material 2" as in the samples 14 to 16, a glass transition point of 130° C. or higher was achieved.

Considering all the results described above together, it is said that the samples 14 to 16 are more excellent in that they achieved superior results on both of dielectric loss tangent and heat resistance.

(5-8) Modified Examples of Samples 13 to 16

In the samples 13 to 16, a phenoxy resin was used as the "organic material 1"; however, the same effect can be expected for a material other than the phenoxy resin. The phenoxy resin belongs to polyether polyols, but a polyether polyol other than the phenoxy resin may be used as with the samples 1 to 4 and the samples 9 to 12. Moreover, even when a material other than polyether polyols or a polyol such as a polyester polyol is used, the same effect can be expected. The same effect can be expected also when two types of organic materials are used in combination as the "organic material 1".

Further, in the samples 14 to 16, diphenylmethane diisocyanate that is an isocyanate compound was used as the "organic material 2"; however, a MDI monomer or a modified product thereof can also be expected to have the same effect as long as it is a MDI-based isocyanate compound.

(5-9) Samples 17 to 20

In the samples 17 to 20, a combination of PVAA (polyvinyl acetoacetal) as the "organic material 1" and TDI (tolylene diisocyanate) as the "organic material 2" is shown.

In this case, in the sample 17 using the "organic material 1" alone, the "(Sum of Atom Group 1)/(Sum of Atom Group 2)" was as large as 1.0 or more, and therefore the dielectric loss tangent was made as low as 0.6% or less.

On the other hand, in the samples 18 to 20 each of which was a cured product obtained by the reaction of the "organic material 1" with the "organic material 2", a glass transition point of 130° C. or higher was achieved, but the "(Sum of Atom Group 1)/(Sum of Atom Group 2)" was less than 1.0 in any mixing ratio, and therefore the dielectric loss tangent was not made as low as 0.6% or less.

DESCRIPTION OF REFERENCE SYMBOLS

1 Film capacitor
3, 4 Dielectric resin film
5, 6 Counter electrode

The invention claimed is:

1. A dielectric resin composition for a film capacitor, the dielectric resin composition comprising:
 a first atom group including at least one functional group selected from among a methylene group, an aromatic ring and an ether group and having a first molar polarizability; and
 a second atom group including at least one functional group selected from among a hydroxyl group, an amino group and a carbonyl group and having a second molar polarizability, wherein
 the first molar polarizability is smaller than the second molar polarizability, and
 with respect to absorption band intensities of the functional groups,
 a value calculated from a formula (sum of absorption band intensities of the first atom group)/(sum of absorption band intensities of the second atom group) is 1.0 or more, when
 as the absorption band intensity resulting from the methylene group, an intensity of a peak of a methylene group on a lowest wavenumber side of 4 peaks detected in a wavenumber range of 3000 to 2900 $cm^{-1}$ is used,
 as the absorption band intensity resulting from the aromatic ring, an intensity of a peak detected in a wavenumber range of 1650 to 1550 $cm^{-1}$ is used,
 as the absorption band intensity resulting from the ether group, intensities of two peaks detected in a wavenumber range of 1150 to 1050 $cm^{-1}$ and a wavenumber range of 900 to 800 $cm^{-1}$ are used,
 as the absorption band intensity resulting from the hydroxyl group, an intensity of a peak detected in a wavenumber range of 3700 to 3400 $cm^{-1}$ is used,
 as the absorption band intensity resulting from the amino group, an intensity of a peak detected in a wavenumber range of 3400 to 3200 $cm^{-1}$ is used, and
 as the absorption band intensity resulting from the carbonyl group, an intensity of a peak detected in a wavenumber range of 1750 to 1650 $cm^{-1}$ is used.

2. The dielectric resin composition for a film capacitor according to claim 1, wherein the dielectric resin composition is a cured product obtained by a reaction of at least two types of organic materials including a first organic material and a second organic material.

3. The dielectric resin composition for a film capacitor according to claim 2, wherein the first organic material is a phenoxy resin and the second organic material is an isocyanate compound.

4. The dielectric resin composition for a film capacitor according to claim 2, wherein the first organic material is a phenoxy resin and the second organic material is an epoxy resin or a melamine resin.

5. The dielectric resin composition for a film capacitor according to claim 1, wherein a glass transition point of the dielectric resin composition is 130° C. or higher.

6. A film capacitor comprising:
 a dielectric resin film composed of the dielectric resin composition according to claim 1; and
 first and second counter electrodes opposed to each other with the dielectric resin film sandwiched therebetween.

7. The film capacitor according to claim 6, wherein the dielectric resin composition is a cured product obtained by a reaction of at least two types of organic materials including a first organic material and a second organic material.

8. The film capacitor according to claim 7, wherein the first organic material is a phenoxy resin and the second organic material is an isocyanate compound.

9. The film capacitor according to claim 7, wherein the first organic material is a phenoxy resin and the second organic material is an epoxy resin or a melamine resin.

10. The film capacitor according to claim 6, wherein a glass transition point of the dielectric resin composition is 130° C. or higher.

* * * * *